Figure 1:
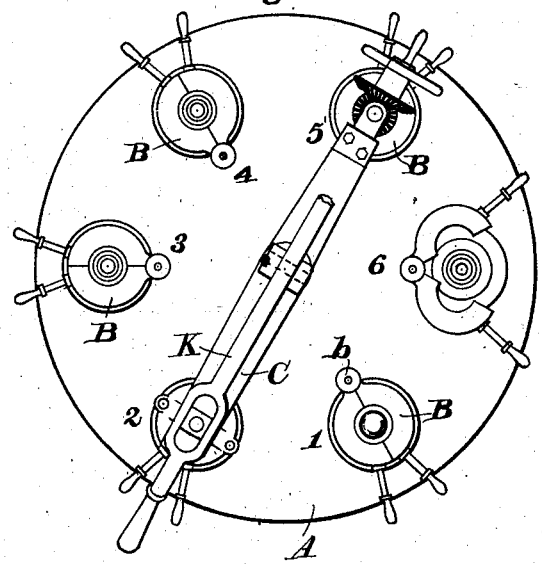

No. 761,326. PATENTED MAY 31, 1904.
W. H. SCHORLING.
MACHINE FOR MOLDING INSULATORS.
APPLICATION FILED JAN. 21, 1904.
NO MODEL. 2 SHEETS—SHEET 1.

WITNESSES:
H. L. Reynolds.
Beatrice Mirvis

INVENTOR
William H. Schorling.
BY
Emerson R. Newell
ATTORNEY

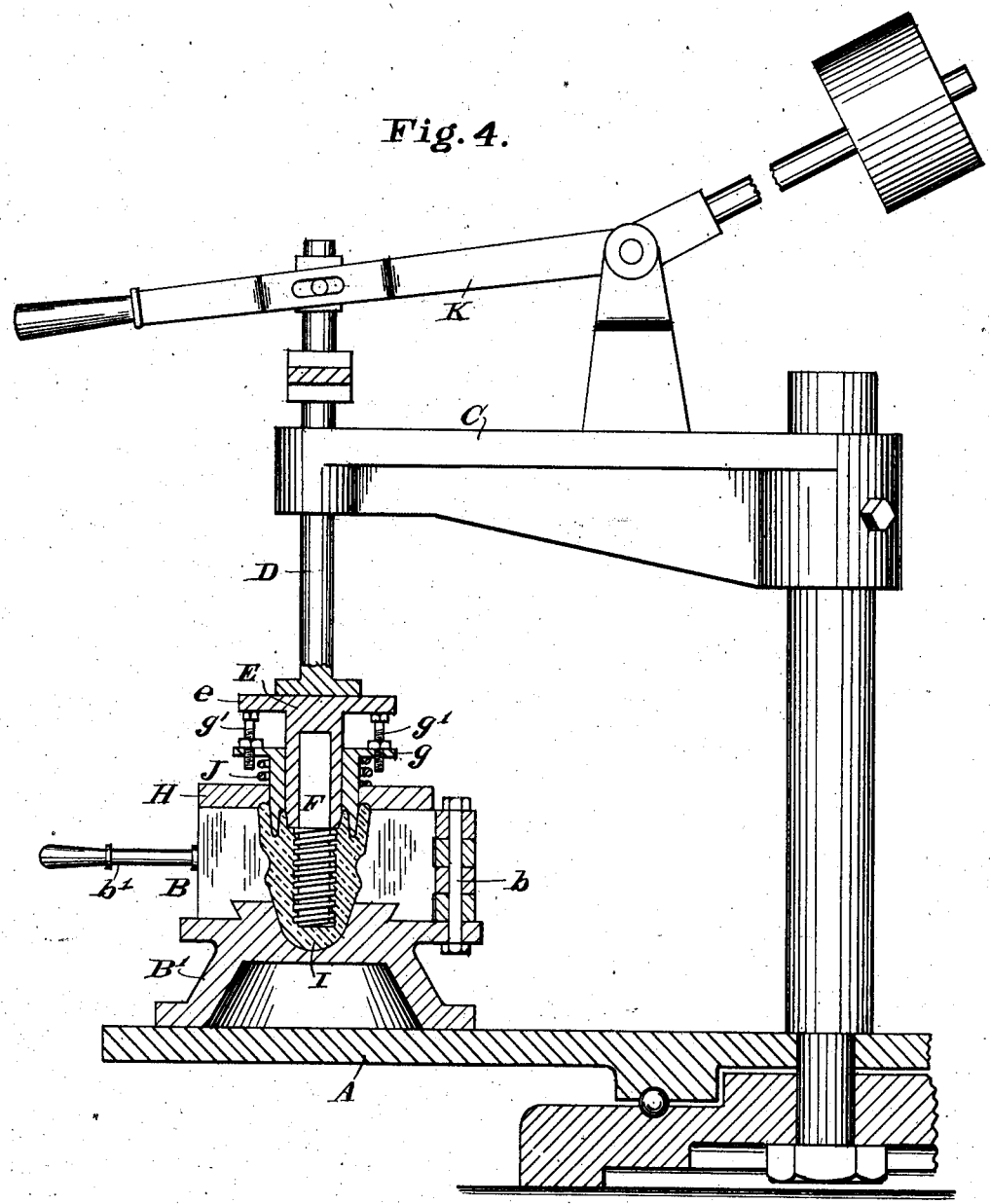

No. 761,326. Patented May 31, 1904.

UNITED STATES PATENT OFFICE.

WILLIAM H. SCHORLING, OF BROOKLYN, NEW YORK, ASSIGNOR TO HENRY M. BROOKFIELD, OF NEW YORK, N. Y.

MACHINE FOR MOLDING INSULATORS.

SPECIFICATION forming part of Letters Patent No. 761,326, dated May 31, 1904.

Application filed January 21, 1904. Serial No. 190,044. (No model.)

*To all whom it may concern:*

Be it known that I, WILLIAM H. SCHORLING, a citizen of the United States, residing at Brooklyn, New York, have invented certain new and useful Improvements in Machines for Molding Insulators, of which the following is a clear, full, and exact description.

My invention relates to an improvement in machines for molding insulators, and particularly to that kind which are known to the trade as "petticoat-insulators."

The object of my invention is to improve and simplify such machines and their operation.

In the drawings accompanying herewith I have represented my invention as embodied in apparatus of a form now preferred by me.

Figure 3:
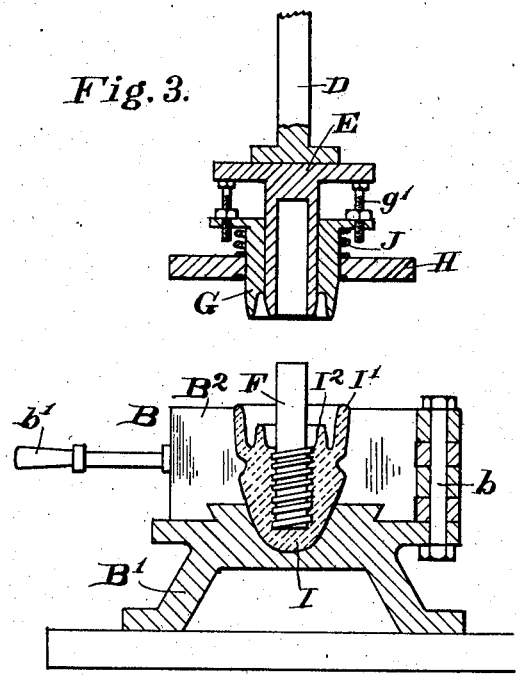
Figure 2:
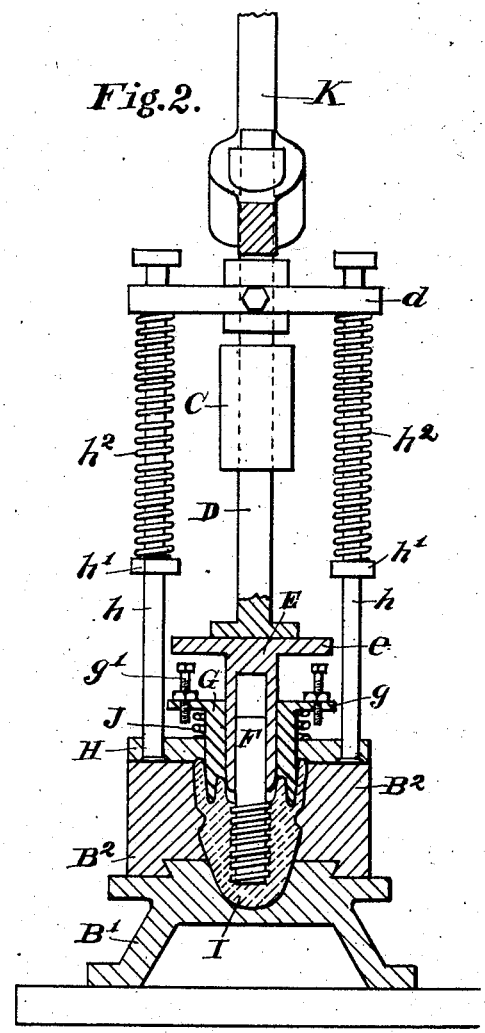

Figure 1 shows a machine embodying my invention in plan view. Fig. 2 is a partial sectional elevation of the mechanism employed in forming or molding the insulator. Fig. 3 is a similar view showing the parts in different positions, and Fig. 4 is an elevation and partial section of the plunger and its operating mechanism.

The type of insulator referred to as "petticoat-insulators" is that in which one or more annular depending flanges are used at the base of the insulator, said flanges constituting what are known as the "petticoats" and serving to protect the insulator-support from a short-circuit connection when the surface of the insulator becomes wet, as during storms. Such an insulator is clearly shown in section in Figs. 2 and 3, in which I represents the insulator and I' I², respectively, the outer and inner petticoats. The method ordinarily adopted in forming these insulators is to place a mass of glass sufficient in quantity to form the insulator in a mold which is shaped to correspond with the exterior shape of the insulator and then forcing parts shaped to correspond with the inner surfaces of the insulator into said mass of soft glass. Such an apparatus is shown in the patent to Seraphin Kribs, No. 542,565, of July 9, 1895. The present apparatus is in the main like that shown in the said patent. By means of the apparatus previously used for this purpose—such, for instance, as is shown in the said patent—it has been found impossible to make as deep petticoats as are sometimes desired by reason of the fact that the portions of the mold which enter the petticoat-recesses or the annular recesses alongside of and between the petticoats will cling or stick to the soft glass to such an extent as to tear out and remove portions of the petticoats or destroy the shape of the same. By my invention I divide the mold into sections such that each petticoat-recess is formed by a separate member and withdraw these members at slightly-different times, so that one is withdrawn from close or clinging contact with the glass before the withdrawal of the one adjacent to it has been started. In addition I make the line of division between the concentric sections such that a shoulder upon one section covers the base of the petticoat or flange to thereby hold it down while the adjacent section is being freed from the glass. By being freed from the glass I do not mean that it is necessarily entirely removed from the insulator, but that the clinging contact is broken. By this method of freeing the mold in sections the tearing strain upon the soft glass constituting the petticoats is reduced to that which is produced by the mold at one side thereof, and consequently the liability to destruction or mutilation of this thin flange is reduced. Further, the removal of one section relieves the side pressure of the glass upon the next adjacent section, thus tending to free it and facilitate its removal.

Referring to Fig. 1, A represents a turn-table mounted to turn upon a central vertical axis and having mounted thereon a series of molds B, each consisting of a base B' and two halves B², pivoted upon a pivot $b$ and separable laterally. I have shown six of these molds as mounted upon the turn-table, numbering the various positions from 1 to 6, although other numbers might be used. These molds are clearly shown in section in Figs. 2 and 3. Above the turn-table is an arm C, fixed in position and having a plunger D mounted to reciprocate vertically in guides thereon and in such position that the various molds may be brought under it by turning the turn-table. This plunger either directly or indirectly carries the various forming members employed to mold the inner surfaces of the insulator. The plunger directly carries a member E, which forms the inner surface of the inner petticoat. The forming-surface upon the lower end thereof is tapered or slightly coned. As insulators of this type are generally made with a central screw-threaded recess, I have shown a threaded rod F as having its shank within a central hole in the forming member E. In machines of this class these threaded rods are detachable and are left behind in the glass when the plunger is raised, being later removed by turning or screwing them backward. Outside of the former E, which forms the inner petticoat-recess, is a sleeve G, constituting an annular former or mold for the outer petticoat-recess. This sleeve is adapted to have a limited reciprocation relative to the inner former E. It is herein shown as adapted to slide upon said inner former. Adjustable spacing or set screws $g'$ in a flange $g$ determine the normal relative position of the two formers. Outside the former G for the outer petticoat-recess is a head H, which has a groove just outside the former G, adapted to form the lower edge of the outer petticoat I'. Between head H and flange $g$ of former G is a spring J, which produces a strain upon the former, acting to withdraw it from the insulator suddenly when released, but to prevent sudden shocks which might tear the glass if applied before the former was released therefrom. The head H is carried by side rods $h$, which are mounted to slide through holes in a cross-head $d$, carried by the plunger D. These rods are held down by a yielding pressure produced by springs $h^2$, acting between collars $h'$ and the cross-head $d$. The plunger D is reciprocated by any suitable means—such, for instance, as a lever K.

The operation of the device after the mold $B^2$ has been closed and the glass inserted is as follows: The lever C, with the plunger D, is forced down until the head H contacts with the top of the mold $B^2$, and the screw F and mold-cylinders E and G are forced into the glass, displacing the glass until it fills the mold $B^2$. The inner petticoat of the insulator is thus formed, and the side or lateral pressure upon it, formed by the sides of the cylinders E and F, make the glass tend to stick to these cylinders or mold members, and if they were simultaneously withdrawn the glass would stick to them and the petticoat be broken or deformed. If, however, one is withdrawn before the other, this side pressure upon the petticoat is relieved, as the petticoat can yield slightly to one side or the other, and the other one may thus be withdrawn without danger of the petticoat sticking to it. If the cylinder which is withdrawn first is tapered at its lower end, this side pressure will be relieved as soon as it starts to move, and by "withdrawal" I do not mean that the molding member must necessarily be lifted entirely out of the insulator, for it is only necessary that this side pressure should be relieved, and this relieving of the side pressure is what I mean when I use the word "withdrawal." As soon as this pressure is relieved the petticoat may move slightly, thus relieving the side pressure upon the outer annular member, and consequently to a similar extent relieving the tendency of the glass to stick to such outer member, and when this side pressure upon the outer member is relieved enough to permit the spring J to act the spring J will cause the outer member G to suddenly rise, so that it will be quickly withdrawn out of the petticoat-recess and will break contact with the glass without drawing the glass of the petticoat with it, and consequently breaking or deforming the petticoat. In this way by actual practice I have found that petticoat-insulators may be made with much deeper recesses in them than was possible with machines heretofore used. As the plunger D continues to rise the cross-head $d$ strikes the collars on the upper ends of the rods and raises the head H up above the upper end of the screw F, thus clearing it and allowing the rotation of the table to bring another mold $B^2$ underneath the plunger.

By inspection of Figs. 2 and 3 it will be seen that the line of division between the various forming members is at one side of the petticoats or such that as each of the parts which from a petticoat-recess is withdrawn the bottom edge of the petticoat is held down by the forming member next adjacent, thereby further guarding against injury to the glass forming said petticoat by the withdrawal of said member.

It will be obvious that many variations from the construction shown may be made without departing from my invention as claimed, and I therefore do not intend to limit myself to the particular construction described and illustrated.

What I claim is—

1. A machine for molding petticoat-insulators having separate forming members for each of the petticoat-recesses, and means for withdrawing said members at different times.

2. A machine for molding petticoat-insulators having separate forming members for each petticoat-recess, positive means for withdrawing one of said members, and means for withdrawing the other of said members after the first has been withdrawn.

3. A machine for molding petticoat-insulators having separate forming members for each petticoat-recess, positive means for withdrawing one of said members, and means for withdrawing the other of said members after the first has been withdrawn, and comprising a spring mechanism released by the withdrawal of said first member.

4. A machine for molding petticoat-insulators comprising a head adapted to engage the edges of the outer petticoat, an annular former shaped to form the outer petticoat-recess, and a separate former shaped to form the inner petticoat-recess, said parts being capable of a limited independent reciprocation whereby one former is withdrawn before the other.

5. A machine for molding petticoat-insulators comprising a head adapted to engage the edges of the outer petticoat, an annular former shaped to form the outer petticoat-recess, and a separate former shaped to form the inner petticoat-recess, said parts being capable of a limited independent reciprocation, and a withdrawing-spring connecting the outer annular former with one of the other members to withdraw said outer former after said inner one is withdrawn.

6. In a machine for molding petticoat-insulators, in combination, a turn-table having a series of molds thereon, a plunger mounted to reciprocate in fixed location above said turn-table and to register with said molds as they are brought beneath it, and a plurality of petticoat-forming members carried by said plunger and adapted to be withdrawn from the mold non-synchronously.

7. A machine for molding petticoat-insulators having a former adapted to form an inner petticoat-recess, an annular former outside of the same to form an annular petticoat-recess, means to withdraw said formers at different times, that one which is first withdrawn having its lower edge tapered.

8. In a molding-machine, in combination, a relatively stationary mold in which the article is formed, a plunger entering the same and comprising an inner-recess-forming member and an annular outer-recess-forming member sliding upon said first member, means to withdraw said inner member first, and a spring device released by the withdrawal of said inner member and adapted to suddenly withdraw said annular member.

9. In a molding-machine, in combination, a relatively stationary mold in which the article is formed, a plunger entering the same and comprising an inner-recess-forming member and an annular outer-recess-forming member sliding upon said first member, means to withdraw said inner member first, and a spring device released by the withdrawal of said inner member and adapted to suddenly withdraw said annular member, the lower end of said inner member being tapered inwardly.

10. A machine for molding petticoat-insulators having separate forming members for each petticoat-recess, and means for withdrawing said forming members at different times the line of division between said members being substantially coincident with that side surface of the petticoat between them which is adjacent the member first withdrawn.

11. A machine for molding petticoat-insulators having a separate forming member for each petticoat-recess, and means for withdrawing said forming members with the innermost slightly in advance, the outer margin of said members being substantially coincident with the inner surface of the petticoat next outside them.

12. A mechanism for molding petticoat-insulators having a separate forming member for each petticoat-recess and means for withdrawing one member slightly before the other, the member last withdrawn extending over the base of the petticoat formed between said members.

Signed at New York this 19th day of January, 1904.

WILLIAM H. SCHORLING.

Witnesses:
FRANCES L. LEWIS,
BEATRICE MIRVIS.